United States Patent
Schoenmakers et al.

[11] Patent Number: 5,713,787
[45] Date of Patent: Feb. 3, 1998

[54] DEVICE FOR DEBONING MEAT PIECES WITH AN ARTICULATED BONE ASSEMBLY

[75] Inventors: Antonius P. Schoenmakers, Megen; Jacobus W.J. Verheijen, Middelaar, both of Netherlands

[73] Assignee: Stork Protecon-Langen B.V., Oss, Netherlands

[21] Appl. No.: 489,950

[22] Filed: Jun. 13, 1995

[30] Foreign Application Priority Data

Jun. 13, 1994 [NL] Netherlands ............... 9400954

[51] Int. Cl.$^6$ ................................. A22C 17/04
[52] U.S. Cl. ................................. 452/136
[58] Field of Search ............... 452/136, 135, 452/125, 128

[56] References Cited

U.S. PATENT DOCUMENTS

| | | | |
|---|---|---|---|
| 3,233,282 | 2/1966 | Segur | 452/136 |
| 3,866,271 | 2/1975 | McNeil | 452/136 |
| 4,669,150 | 6/1987 | Manmoto et al. | 452/136 |
| 5,127,872 | 7/1992 | Mielnik | 452/136 |
| 5,173,077 | 12/1992 | van den Nieuwelaar et al. | 452/135 |
| 5,462,477 | 10/1995 | Ketels | 452/136 |

FOREIGN PATENT DOCUMENTS

| | | | |
|---|---|---|---|
| 2086707 | 7/1994 | Canada | A22C 21/00 |
| 0270513 | 6/1988 | European Pat. Off. | A22C 17/04 |
| 0502581 | 9/1992 | European Pat. Off. | A22C 17/00 |
| 0544103 | 6/1993 | European Pat. Off. | A22C 17/00 |
| 0590733 | 4/1994 | European Pat. Off. | A22C 17/04 |

*Primary Examiner*—Willis Little
*Attorney, Agent, or Firm*—Webb Ziesenheim Bruening Logsdon Orkin & Hanson, P.C.

[57] ABSTRACT

The invention relates to a device for making at least one cut in a meat piece with an articulated bone assembly, including at least two elongate bone pieces which are mutually connected in substantially rigid manner in a connecting zone and which extend from the connecting zone end initially enclose an angle, wherein the device includes: a support means for supporting the meat piece; a cutting assembly for making at least one cut in the meat piece; a positioning assembly for positioning the meat piece relative to the cutting assembly, wherein the positioning assembly comprise a positioning element which is insertable in the angle area between the mutually joined bone pieces and which is adapted to be urged relative to the meat piece into the angle in the connecting zone. The invention further relates to such a device, wherein the bone assembly includes a protruding bone part, for instance a heel bone, and wherein the device is provided with a support assembly for supporting the meat piece for deboning and with a cutting assembly for separating the protruding bone part from the bone assembly.

20 Claims, 2 Drawing Sheets

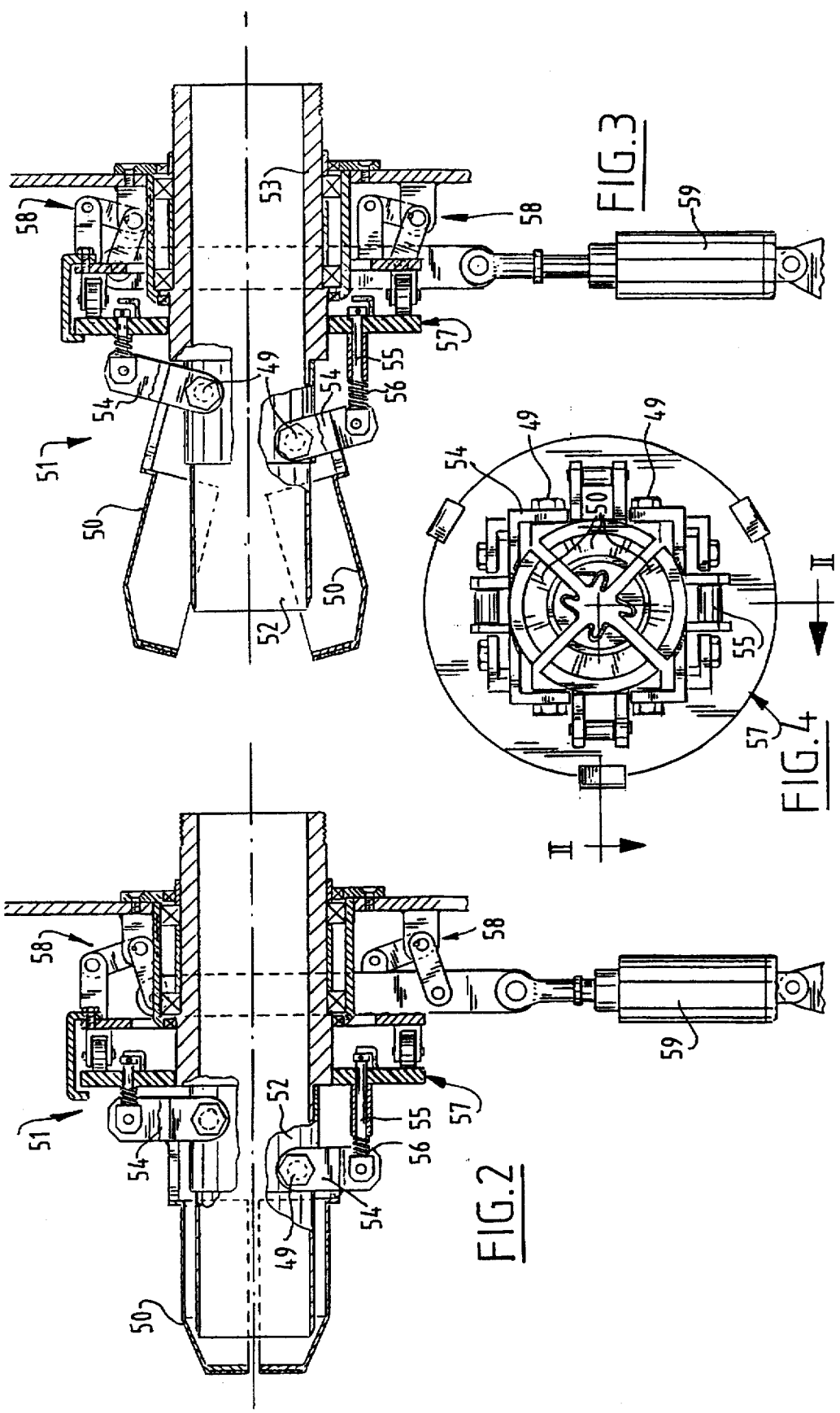

DEVICE FOR DEBONING MEAT PIECES WITH AN ARTICULATED BONE ASSEMBLY

BACKGROUND OF THE INVENTION

1. Field of the Invention

The invention relates to a device for making at least one cut in a meat piece with an articulated bone assembly, comprising at least two elongate bone pieces which are mutually connected in a connecting zone and which extend at an angle from the connecting zone, wherein the device comprises: support means for supporting the meat piece; and cutting means for making at least one cut in the meat piece.

2. Description of the Prior Art

Making a cut in a bone piece usually forms a preliminary operation for deboning of the relevant meat piece. It may however also be a preliminary operation for another subsequent operation, for example boiling or smoking of for instance ham.

In the prior art devices of such type the positioning takes place wholly by hand in order to perform the cut at the correct position.

It will be apparent that it is preferable to have positioning of the meat piece take place in at least a partly mechanical manner. The object of the invention is to provide such a device which is suitable for causing positioning to take place in at least a partly mechanical manner.

SUMMARY OF THE INVENTION

This object is achieved by positioning means for positioning the meat piece relative to the cutting means, wherein the positioning means comprise a positioning element which is insertable between the mutually joined bone pieces and which is adapted to be moved relative to the meat piece to the connecting zone.

With this device the meat piece is placed in the device such that the positioning means are placed between the mutually joined bone pieces, whereafter a force is exerted by hand on the meat piece whereby the connecting zone of the bone parts is urged toward the positioning element. This movement is stopped as soon as the meat piece strikes against the positioning element. The positioning element as it were fulfills the function of a stop.

According to a preferred embodiment the device comprises gripping means for exerting on the meat piece a force directed such that the connecting zone is urged toward the positioning element.

Only the placing of the meat piece in the device hereby need take place manually; gripping of the meat piece and applying of a force which urges the connecting zone of the bone pieces to the positioning element take place mechanically.

Due to the straightening of the bone piece beforehand it is now possible to accurately determine the positions in which the preliminary incisions to be made in the meat piece must be placed.

The invention also provides a device for deboning meat pieces with an articulated bone assembly, wherein the bone assembly comprises a protruding bone part, for instance a heel bone, and wherein the device is provided with holding means for fixedly holding the meat piece for deboning, with positioning means for positioning the heel bone, and with separating means for detaching the protruding bone part from the bone assembly.

These steps enable removal of such protruding bone pieces. They may otherwise impede subsequent operations.

The invention likewise provides a device for deboning meat pieces with an articulated bone assembly, wherein the bone assembly is provided with two bone pieces extending at least substantially parallel and mutually connected on at least one side, wherein the device comprises clamping means for fixedly holding the meat piece for deboning and cutting means for severing at least one of the substantially parallel bone pieces.

This is of particular importance in the case of articulated bone assemblies, wherein two hones run mutually parallel, as is the case with a spoke bone and splint bone. Such a parallel progress of the bones causes problems in further processing such as stripping, so that it is desirable to detach beforehand the smallest bone, that is, the spoke-bone.

According to the invention this parallel bone can be detached at one end by a cutting or sawing movement, whereafter the other end can be pressed away by means intended for that purpose.

The invention further relates to a device for deboning meat pieces with an articulated bone assembly, wherein the bone assembly is provided with at least two bone pieces extending substantially parallel, wherein the device comprises clamping means for fixedly holding the meat piece for deboning and a penetrating element adapted to enlarge the angle between the substantially parallel bone pieces.

This device is particularly attractive with the above stated device for deboning meat pieces of which the bone assembly comprises two bone pieces extending substantially parallel and wherein the device is adapted to saw or cut through at least one of these bone pieces. After release the detached bone is moved outward by this device, whereafter it no longer impedes subsequent operations such as deboning. It is however also possible to make direct use of the stated device, for instance when the relevant bone piece can be broken off by the device.

BRIEF DESCRIPTION OF THE DRAWINGS

Above mentioned and other features will be further elucidated with reference to the annexed drawings, in which:

FIG. 2 is a sectional view in a first position of the stripping device for use in the invention;

FIG. 3 is a sectional view of the stripping device in a second position; and

FIG. 4 is a front view of the stripping device in the figure description hereinbelow of an embodiment of the invention.

DESCRIPTION OF THE PREFERRED EMBODIMENT

Figure 1:
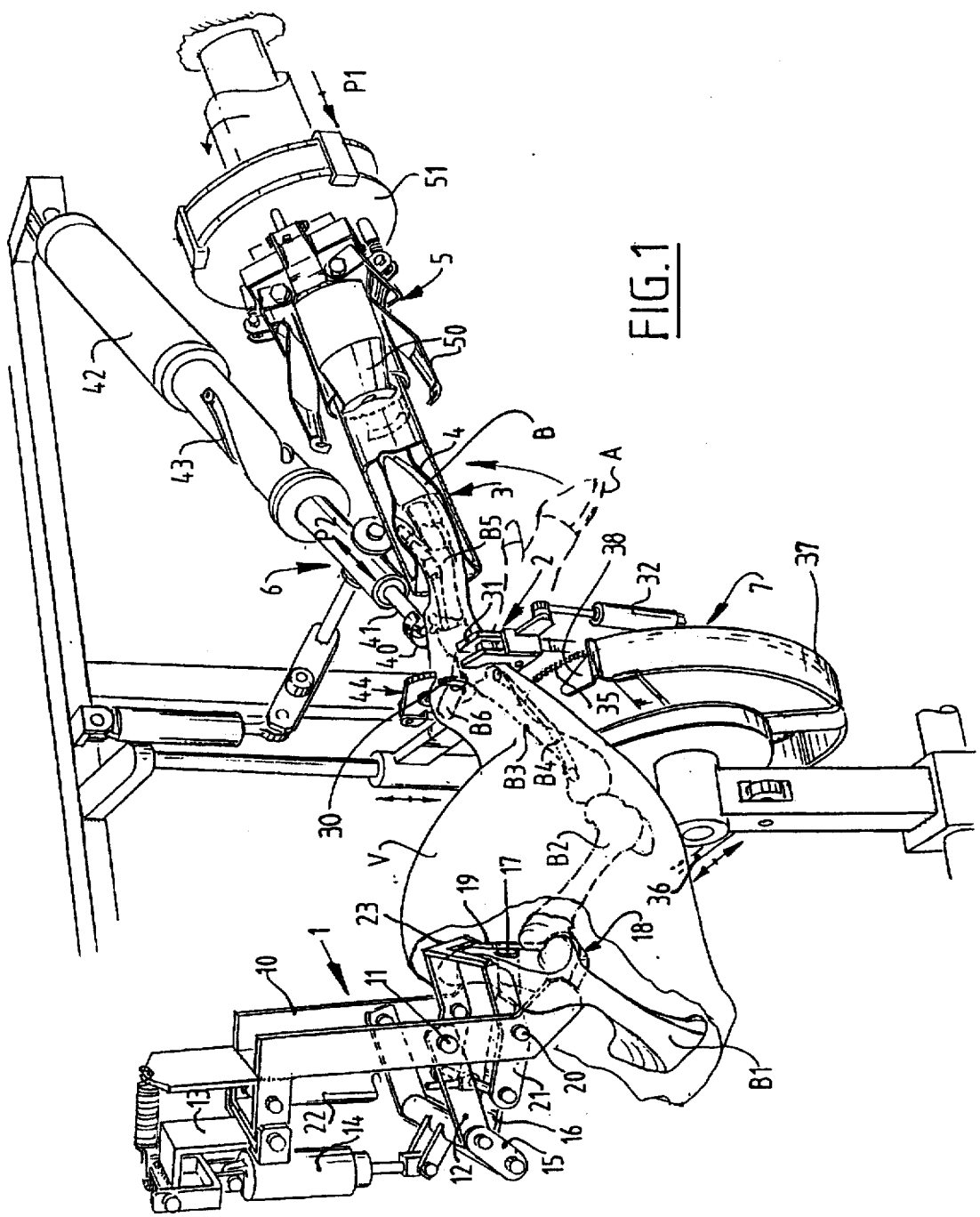
FIG. 1 shows a schematic perspective view of a device according to the invention.

FIG. 1 shows schematically the handling of a piece of meat, in particular the ham of a pig, with the processing members for deboning thereof used for this purpose. It is however possible to apply other types of meat pieces with the invention, for instance forelegs, wings of poultry, for example of ostriches, or rib cages.

The meat piece V shown in the figure has an articulated bone assembly consisting of a pelvic bone B1, a thigh bone B2, a splint bone B3, a spoke bone B4 and a foot B5 with heel bone B6.

For deboning in the embodiment shown the pelvic bone B1 is clamped fixedly in a first clamp 1, elucidation of which follows below.

Arranged according to the invention at a distance from the first clamp 1 is a second clamp 2 which operates close to the heel bone. This second clamp is also further elucidated hereinbelow. The second clamp is provided with a cutting or sawing appliance 7 which serves to arrange an incision close to the second clamp 2.

Finally, a third clamp 3 is arranged round the foot, which clamp comes into operation after the bone assembly is straightened from a position A shown in dashed lines to the straightened position B, so that the sleeve-like clamp 3 with inflating cushion 4 arranged therein can be pushed and clamped fixedly round the foot.

A stripping device 5 can slide over clamp 3 in axial sense as according to arrow P1, the operation of which is elucidated below.

Finally arranged close to the second clamp 2 is a pressing member 6 which serves to detach the splint bone B3.

Although this is not shown, it is assumed that the different components as shown in FIG. 1 are accommodated in a common frame which is provided with a support plate for supporting the meat piece V.

The collective frame bears the first clamp 1, wherein the two parallel arms 10 are fixed to this frame. Halfway along the parallel arms 10 a pivot arm 12 is arranged movably at 11 and is pivotable relative to arms 10 by means of a cylinder 14 connected to a rocker piece 13. The arms 12 are elongated with two arms 15 to which is fixed a strip 16 which ends in a pin 17. The arms 10 are mutually joined at the bottom end by a bottom plate 18, the leading edge 19 of which serves as cutting knife which must be pushed under the pelvic bone B1.

Arms 10 are hingedly connected at 20 to two thermo-arms 21 which are movable up and downward by means of a cylinder 22 which is supported by arms 10. The other ends of arms 21 are connected by a knife 23 which can be moved behind the pelvic bone B1 in the direction of the cutting edge 19 of bottom plate 18 by energizing the cylinder 22.

The pelvic bone B1 can herewith be clamped between the bottom plate 18 and the upper knife 23, wherein the position is precisely determined by the pin 17 which protrudes into the hole of thigh bone B1.

A clamp of this type is otherwise described in EP-A-0 590 733 in the name of Stork Protecon B. V.

The meat piece V is then gripped by the second clamp 2 which consists of a positioning element, such as pin-shaped member 30, which is carried through the meat piece in the V-shaped bone piece consisting of the splint bone B3 and the heel bone B6. The pin-shaped member 30 is formed integrally with a stop located at a distance therefrom and is pivotable relative to a frame part by means of a cylinder 32. Various elements are embodied such that the pin-shaped part 30 is pressed upward from below into meat piece V into the angle of the V-shaped bone part.

The pin forms a positioning element for accurately determining the position of the meat piece. This is important in respect of the operations to be performed on the meat piece after positioning thereof, such as making incisions, deboning or smoking of the meat piece.

This clamp 2 can be moved away from clamp 1 so that the bone piece can thus be carried from the bent position to the straightened position, as indicated with full lines in the figure.

It is pointed out that it is equally possible to omit clamp 1 and to hold the relevant meat piece by hand at the position of clamp 1 and to exert the force for pulling to the positioning element the connecting zone between both bone pieces until positioning is achieved.

Clamp 2 is provided with a cutting or sawing station which consists of a saw blade 35 which is movable from below in up and downward direction relative to meat piece V by means of a parallel guide 36.

With the sawing edge of saw blade 35 an incision can thus be made from below in the meat piece close to clamp 2 such that the spoke bone B4 can be sawn through on the right-hand side of the figure, that is, as close as possible to the foot. The position of the incision is precisely determined due to the second clamping member 2 which during straightening also determines the position of saw blade 35. Although in the present embodiment the spoke bone is sawn through, it is of course likewise possible to saw or cut off the parallel bone, i.e. the splint bone B3.

Arranged round saw blade 35 is a protective cover 37 on which is fixed a cam 38. The cam serves to urge the two bone pieces a small distance apart.

As soon as the spoke bone B4 has been severed a pressing member 6 can be guided in the direction of the hock or splint bone B3 therealong from the foot or the heel, for which purpose the pressing member is provided with a spoon-like curved member 40, the leading edge of which serves as pressing edge, so that when it slides in the direction of arrow P2 the other end of spoke bone B4 can be struck loose of the hock or splint bone B3.

For this purpose the spoon-like member 40 is arranged on a spindle 41 which can be pushed in the direction of arrow P2 by means of a cylinder 42, for which purpose the holder of spindle 41 can be set into a rotating movement by means of a spiral guide 43.

It is noted that, prior to spoke bone B4 being pressed off, the heel bone B6 can if desired be cut through by means of a shear system 44 which operates near the pin-shaped member. The shear system is formed by a knife together with the positioning pin 30.

The pressing member 6 can also be set into operation only after the clamping member 2 is removed for a better accessibility. The foot B5 must then be set beforehand in clamp 3, whereby the straightened position can be maintained after clamp 2 has been released.

After spoke bone B4 has been detached and heel bone B6 cut off, the stripping member 5 can be pushed forward over the clamp 3 in the direction of arrow P1. The stripping segments 50, four of which are shown in the drawing, can be carried from an opened position as according to the drawing to a closed position by means of a mechanism 51 (not shown). Segments 50 can likewise rotate round the axis formed by the centre line of clamp 3. These stripping segments 50 come into operation behind the heel bone and will push the flesh away over the bones in the bone assembly so that the meat is stripped from the bone.

The construction of the clamp 3 is otherwise also described in EP-A-0 590 733. The construction of the stripping device applied in the present invention differs however from the device known from the cited literature reference.

The known device has the drawback that when the segments are moved in radial direction relative to the bone piece the segments likewise perform a movement in axial direction. This results in clamping problems when there are irregularities in the shape of the bone piece for stripping. In the present embodiment this problem is avoided by using rotation points of the scraper elements 50 located closer to the centre.

As shown in FIG. 2, the mechanism comprises a drum 52 around which a sleeve 53 is arranged slidably in axial direction. Fixed to the sleeve 53 are four shafts to which scraper elements 50 are mounted via levers 54. The levers are connected to control rods 55 which are connected to a plate 57 via springs 56. The scraper elements are moved by axial movement of plate 57. The latter is movable by means of an operating mechanism 58 and a linear drive member in the form of a pneumatic cylinder 59. FIG. 3 shows the same device in the outward placed position of the scraper elements, while FIG. 4 shows a front view of the scraper device.

In preference, by completely closing the lower knife 18 and the upper knife 23 of clamp 1 the pelvic bone B1 can first be detached from the bone assembly so that stripping can proceed further without disturbance.

In the above shown manner it is possible to remove the meat wholly undamaged from the bone assembly without adversely affecting the structure of the meat.

The invention is not limited to the above described embodiment.

We claim:

1. A device for making at least one cut in a meat piece with an articulated bone assembly having at least two elongate bone pieces which are mutually connected in substantially rigid manner in a connecting zone and which extend from the connecting zone and initially enclose an angle, wherein the device comprises:

support means for supporting the meat piece;

cutting means for making at least one cut in the meat piece; and a pin-like member for positioning the meat piece relative to the cutting means, wherein the pin-like member is insertable in an angle area between the mutually connected bone pieces and which is adapted to be urged relative to the meat piece into the angle in the connecting zone.

2. The device as claimed in claim 1, wherein the device further comprises gripping means for exerting on the meat piece a force directed such that the connecting zone is urged toward the pin-like member.

3. The device as claimed in claim 1, wherein the device further comprises deboning means for deboning the meat piece.

4. The device as claimed in claim 1, wherein the device is adapted to debone a leg of an animal and the pin-like member is adapted for insertion between a heel bone and a hook.

5. The device as claimed in claim 1, wherein the cutting means are adapted to make a cut extending to the bone.

6. The device as claimed in claim 3, wherein the deboning means are adapted to remove the meat by means of stripping.

7. The device as claimed in claim 1, wherein the positioning means are combined with means for making a cut.

8. A device for deboning meat pieces with an articulated bone assembly, wherein the bone assembly comprises a protruding bone part and wherein the device comprises: means for supporting the meat piece for deboning; positioning means for positioning the protruding bone part, with the positioning means including a pin-like member movable relative to the positioning means and configured to move the bone assembly from a bent position to a straightened position; and cutting means for separating the protruding bone part from the bone assembly, wherein the positioning means and cutting means are carried on the support means.

9. A device for deboning meat pieces with an articulated bone assembly, wherein the bone assembly comprises: a protruding bone part and wherein the device comprises means for supporting the meat piece for deboning; positioning means for positioning the protruding bone part, with the positioning means including a pin-like member; and cutting means for separating the protruding bone part from the bone assembly, wherein the cutting means are formed by a knife and wherein the positioning means and cutting means are carried on the support means.

10. The device as claimed in claim 9, wherein the knife has a plier configuration.

11. The device as claimed in claim 9, wherein the knife has a hook-like configuration.

12. A device for making at least one cut in a meat piece with an articulated bone assembly having at least two elongate bone pieces which are mutually connected in substantially rigid manner in a connecting zone and which extend from the connecting zone and initially enclose an angle, wherein the device comprises:

support means for supporting the meat piece;

cutting means for making at least one cut in the meat piece;

positioning means for positioning the meat piece relative to the cutting means, wherein the positioning means comprise a positioning element which is insertable in an angle area between the mutually connected bone pieces and which is adapted to be urged relative to the meat piece into the angle in the connecting zone; and gripping means for exerting on the meat piece a force directed such that the connecting zone is urged toward the positioning element.

13. A device for deboning meat pieces with an articulated bone assembly, wherein the bone assembly is provided with at least two bone pieces extending substantially parallel and mutually connected on at least one side, wherein the device comprises: clamping means for fixedly holding the meat piece for deboning; cutting means for cutting into at least one of the substantially parallel bone pieces; and a pin-like member movable relative to the clamping means for positioning the meat piece from a bent position to a straightened position relative to the cutting means.

14. A device for deboning meat pieces with an articulated bone assembly, wherein the bone assembly is provided with at least two bone pieces extending substantially parallel and mutually connected on at least one side, wherein the device comprises: clamping means for fixedly holding the meat piece for deboning; cutting means for cutting into at least one of the substantially parallel bone pieces; and a pin-like member for positioning the meat piece relative to the cutting means, wherein the cutting means are formed by at least one of a knife and a saw.

15. The device as claimed in claim 14, wherein the saw is a circular saw.

16. A device for deboning meat pieces with an articulated bone assembly, wherein the bone assembly is provided with at least two bone pieces extending substantially parallel, wherein the device comprises holding means for fixedly holding the meat piece for deboning and a pressing member carried on said holding means and adapted to press apart the bone pieces in order to break a connection between one of the bone pieces and the connecting zone.

17. The device as claimed in claim 16, wherein the pressing member includes a substantially cylindrical body which is provided with a linear drive member for urging the substantially cylindrical body between the parallel bone pieces.

18. The device as claimed in claim 17, wherein the linear drive member is adapted to cause the pressing member to perform a helical movement.

19. The device as claimed in claim 17, wherein the body has the form of a hook.

20. The device as claimed in claim 16, further including positioning means for positioning the meat piece.

* * * * *